United States Patent
Lachance (10) Patent No.: US 6,246,882 B1
(45) Date of Patent: Jun. 12, 2001

(54) WIDE AREA ITEM TRACKING SYSTEM

(75) Inventor: Matthieu Lachance, Outremont (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/219,172

(22) Filed: Dec. 22, 1998

(51) Int. Cl.$^7$ .................................................. H04Q 7/20
(52) U.S. Cl. ........................ 455/456; 455/426; 455/457
(58) Field of Search ................................ 455/456, 457, 455/421, 422, 562, 426, 88; 340/572.1, 572.2, 568.1, 10.2, 10.33, 573.1, 825.49, 10.4

(56) References Cited

U.S. PATENT DOCUMENTS

| | | | |
|---|---|---|---|
| 4,748,655 | * | 5/1988 | Thrower et al. ........................ 455/461 |
| 5,155,689 | * | 10/1992 | Wortham .................................. 340/990 |
| 5,448,110 | | 9/1995 | Tuttle et al. . |
| 5,606,595 | * | 2/1997 | Ejzak ...................................... 370/349 |
| 5,652,570 | * | 7/1997 | Lepkofker ............................ 340/407.1 |
| 5,686,902 | * | 11/1997 | Reis et al. ........................... 340/825.49 |
| 5,706,014 | * | 1/1998 | Abbasi .................................. 342/457 |
| 5,742,233 | * | 4/1998 | Hoffman et al. .................... 340/10.41 |
| 5,787,174 | * | 8/1998 | Tuttle .................................... 324/764 |
| 5,797,099 | * | 8/1998 | Ejzak et al. ............................ 370/326 |
| 5,895,436 | * | 4/1999 | Savoie et al. ............................ 342/44 |
| 5,918,180 | * | 6/1999 | Dimino ................................ 340/825.5 |
| 5,983,109 | | 11/1999 | Montoya et al. ....................... 455/456 |
| 6,002,344 | * | 12/1999 | Bandy et al. ....................... 340/825.54 |
| 6,040,774 | * | 3/2000 | Schepps ............................. 340/825.36 |

FOREIGN PATENT DOCUMENTS

| | | |
|---|---|---|
| 42 13 110 A1 | 10/1993 | (DE) . |
| 198 03 960 A1 | 8/1998 | (DE) . |
| WO 95/26522 | 10/1995 | (WO) . |
| WO 97/43740 | 11/1997 | (WO) . |
| WO 98/00945 | 1/1998 | (WO) . |
| WO 98/11520 | 3/1998 | (WO) . |
| WO 99/33040 | 7/1999 | (WO) . |

OTHER PUBLICATIONS

Loring Wirbel, "Deal could put RF ID chips on paper", *Electronic Engineering Times* Mar. 9, 1998.

Lim, et al., "A Study on the Design of Large–Scale Mobile Recording and Tracking Systems", *IEEE Proc. 31st Annual Hawaii International Conference on System Sciences*, 1998, pp. 701–710.

PCT International Search Report; PCT/SE99/02232; mailed Jun. 5, 2000.

* cited by examiner

*Primary Examiner*—Dwayne Bost
*Assistant Examiner*—Sonny Trinh
(74) *Attorney, Agent, or Firm*—Jenkens & Gilchrist (57) ABSTRACT

A system and method for wide area item tracking. An item identifier for a tracked item is detected in a handling zone within a cellular network. A mobile station associated with the handling zone transmits a signal containing the item identifier and a zone identifier over an air interface of the cellular network. Upon receipt of the signal, data correlating the item identifier and the handling zone is stored in a database. Subsequently, a request for the current location of the tracked item is received, and the stored correlation data is retrieved to determine the current handling zone for the tracked item. The cell location of the handling zone is then determined. In one implementation, the mobile station transmits a registration signal, permitting the cellular network to determine in which cell the handling zone is currently located, and data associating the handling zone with the current cell is stored. Then, in response to the location request, the association data is retrieved to determine the current cell. In another implementation, the mobile station is paged and the page return signal is used to identify the current cell, which can be converted into geographical location data using a look-up table.

17 Claims, 5 Drawing Sheets

WIDE AREA ITEM TRACKING SYSTEM

BACKGROUND OF THE INVENTION

1. Technical Field of the Invention

The present invention relates to a method and system for tracking items over a wide area, and in particular, for tracking items during transport within a cellular packet data network.

2. Description of Related Art

Wide area item tracking systems are currently used for partial location tracking of pallets, loads, containers, trucks, and the like. Such systems are useful, for instance, in the parcel shipping industry and for supply delivery in just-in-time manufacturing operations (i.e., where supplies reach the manufacturing plant at approximately the time they are needed). In existing systems, the identity of each particular item is entered into the tracking system at each control stage (e.g., when the item is loaded onto a truck) or when the item reaches a manufacturing plant. Typically, manual entry of the item's identity is performed using a bar code reader to scan in an item identifier or using a keypad to key in an item identifier. Between each control stage, however, there is no way to determine the current location of the item. Instead, these systems can generally only tell the customer what is the last control point that his or her item has reached. As a result, the customer cannot tell if the delivery is progressing or if, for example, the item is simply sitting in a truck at a loading dock. Such systems are too inaccurate and are insufficient for locating important items in a parcel delivery service or in a just-in-time manufacturing supply operation.

As one alternative, handling zone item tracking systems are also available for use in the manufacturing industry. Such systems, however, offer only limited indoor coverage and cannot provide tracking for wide area delivery applications. Another alternative is to use a Global Positioning Satellite (GPS) system for tracking trucks and other mobile shipping containers. The position of the truck or container, as determined by the GPS system, can then be transmitted to a monitoring center. GPS systems, however, are too expensive for most applications.

There is a need, therefore, for a system and method for providing more accurate and efficient item tracking across a wide area at a relatively low cost. Such a system would provide information about the current geographical location of a particular item and would be useful, for example, for customers, suppliers, and delivery service providers in the parcel delivery and just-in-time manufacturing industries.

SUMMARY OF THE INVENTION

The present invention comprises a wide area item tracking system and method. Each item to be tracked in the system has associated therewith an item identifier. Preferably, the item identifier is encoded in a radio frequency identification device (RFID) that is attached to the item, although other methods of associating the item and the item identifier can be used. The wide area of the system includes a plurality of handling zones, such as a truck or a manufacturing plant, where items are manipulated or transported during the delivery or shipping process. When the item is moved past a handling zone interrogator into a new handling zone, an item identification reader detects the item identifier. A mobile station connected to the item identification reader transmits a signal containing the item identifier and an identification of the handling zone over an air interface of a cellular network. Preferably, the cellular network comprises a wireless packet data service. After the signal is received by the cellular network, data associating the item identifier with the handling zone identifier and a corresponding location is stored in a database.

In one embodiment, the mobile station periodically transmits a registration signal that contains an identification of the handling zone. The current cell within which the handling zone is located can then be determined based on which base station in the cellular network receives the registration signal. Data associating the handling zone with an identification of the current cell is then stored in a location node. Subsequently, a request for the current location of the tracked item is received by the tracking system. In response, the tracking system retrieves the handling zone identification that is associated with the tracked item from the database. Using the handling zone identification, the identification of the current cell is retrieved from the location node. The current cell identification can then be converted into an approximate geographical location for responding to the location request.

In an alternative embodiment, the current cell identification is not stored in a location node. Instead, when a location request is received by the tracking system, the handling zone identifier with which the tracked item is associated is retrieved, and then the tracking system initiates a page signal in the cellular network directed toward the mobile station of the identified handling zone. The mobile station responds to the page with a page return signal, which is received at a currently serving base station of the current cell. Based on which base station in the cellular network receives the page return signal, the cellular network is able to identify the current cell. The current cell identification can then be converted into an approximate geographical location for responding to the location request.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
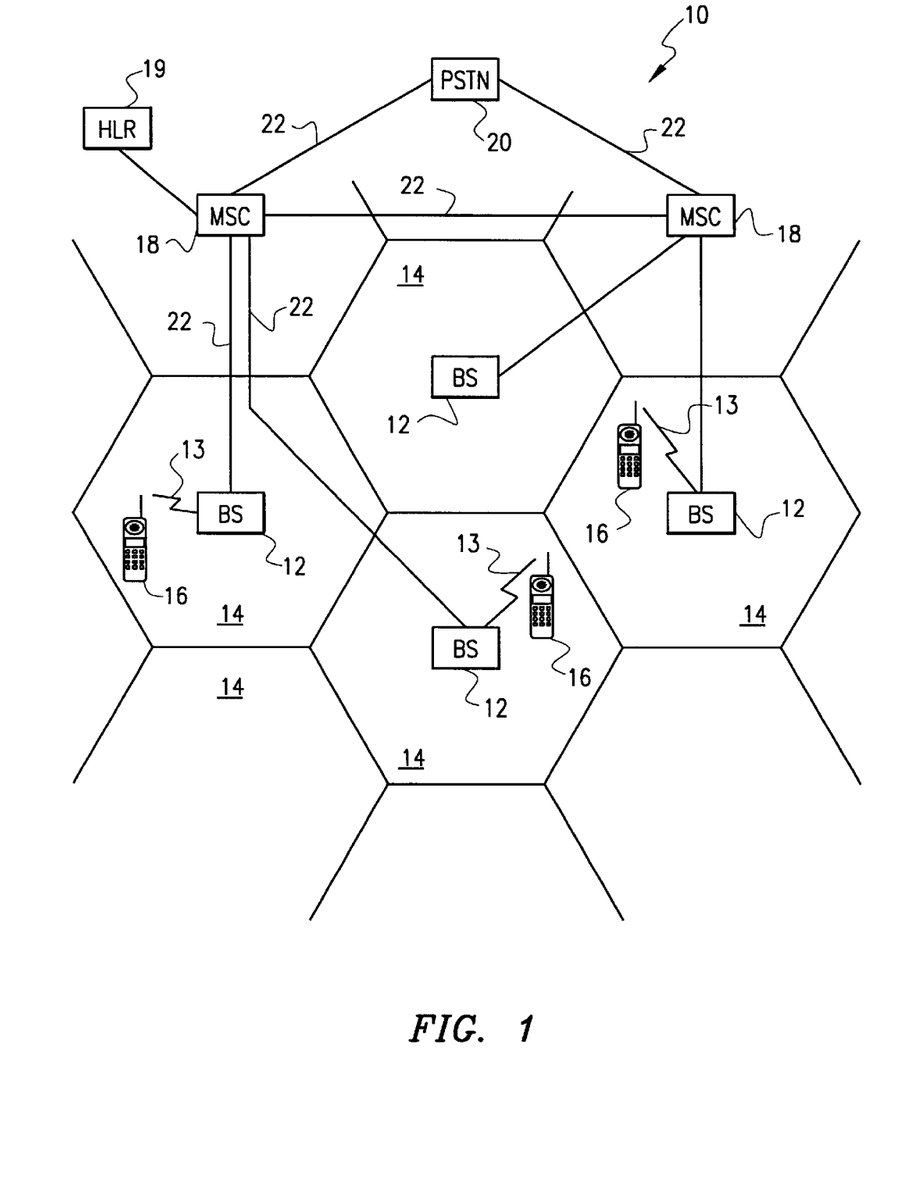
FIG. 1 is a block diagram of a prior art cellular network which can be used to support the operation of the present invention.

Referring now to FIG. 1, there is illustrated a block diagram of a cellular network 10 for supporting the operation of the present invention. Generally, the network 10 includes a plurality of base stations (BSs) 12, each of which serves a particular geographical area or cell 14. Cellular communications with mobile stations 16 within each cell 14 are accomplished by transmitting signals over an air interface 13 between the base station 12 for the cell 14 and the mobile stations 16. The plurality of base stations 12 are controlled by a mobile switching center (MSC) 18, which coordinates channel allocations for communications within the cellular network 10 and facilitates handoffs of communications between base stations 12 as mobile stations 16 move between cells 14. Signals received at the base station 12 are forwarded to the MSC 18 for routing to another mobile station 16 (via a base station 12), to another MSC 18, or to a public switched telephone network (PSTN) 20, depending on the identity and location of the other party to the call. Similarly, signals received at the MSC 18 from other parties and intended for a particular subscriber's mobile station 16 are routed to the mobile station's currently serving base station 12 for transmission over the air interface 13 to the mobile station 16.

A home location register (HLR) 22 with which the mobile station 16 is associated stores data identifying the MSC 18 that is currently serving the mobile station 16. In addition, any time a signal (e.g., a page response signal, a registration signal, or a signal received during an ongoing communication) is received at a particular base station 12 from the mobile station 16, the MSC 18 can generally determine which cell 14 the mobile station is currently located in.

Data communications can be implemented in the cellular network 10 using any one of a variety of data transmission technologies. For example, the network 10 can include a wireless packet data service, such as a Cellular Digital Packet Data (CDPD) service or General Packet Radio Service (GPRS) or, alternatively, can comprise a cellular digital control channel (DCCH) type of technology, such as Short Message Service (SMS) or MicroBurst. By using such data transmission technologies, data packets can be transmitted between the mobile station 16 and the cellular network 10 over a shared data communication channel instead of requiring that a traffic channel be allocated for transmitting information, thereby providing a more efficient allocation of resources.

Figure 2:
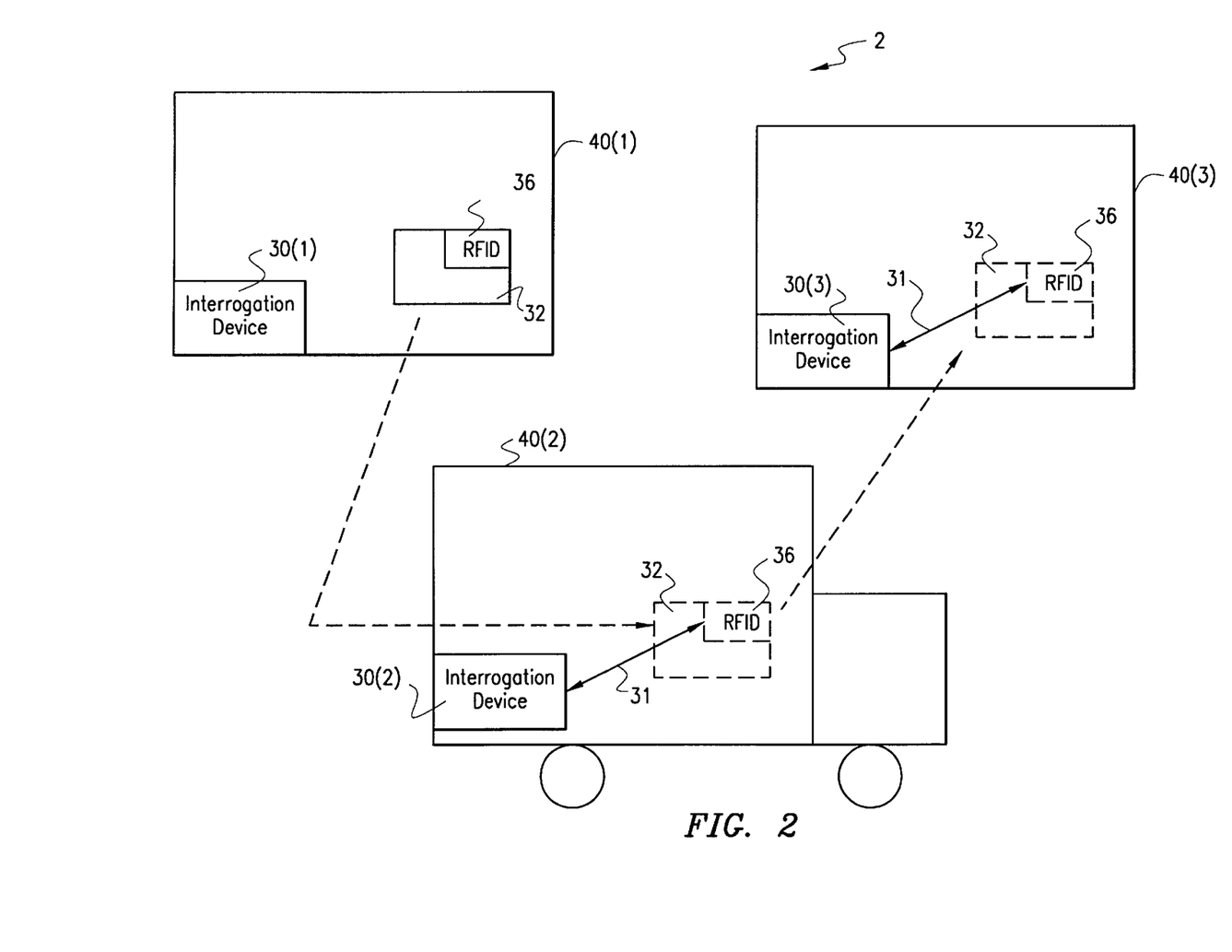
FIG. 2 is a block diagram of a portion of the wide area tracking system according to the present invention.

Referring now to FIG. 2, there is illustrated a block diagram of a portion of the wide area tracking system 2 according to the present invention. The wide area tracking system 2 can be used to track items as they move across a relatively large territory (i.e., more than a single cell 14 of a cellular network 10). The wide area tracking system 2 utilizes a unique combination of a cellular network 10, as shown in FIG. 1, and a Radio Frequency Identification Device (RFID) 36 for each item 32 to be tracked. The cellular network 10 preferably comprises a wireless packet data system, such as CDPD or GPRS, but any type of wireless cellular system, including SMS and MicroBurst, can be used. The RFIDs 36 used in the wide area tracking network 2 are inexpensive passive chips that do not require an energy source and that can each be loaded with information about an object 32 to which the RFID 36 is attached or that can contain an identification code with which a particular object 32 is associated. The information on the RFID 36 can be read at a cellular/RFID chip interrogation device 30 using predefined protocols. RFIDs 36 are currently manufactured by companies such as Micron Communications, Omron, and Tagmaster AB, and current applications for RFID technology include manufacturing parts tracking, hazardous waste tracking, wandering patient tracking, and the like. In each of these known applications, however, tracking is performed only in a very localized area, such as inside a single building, warehouse, or plant.

The wide area tracking system 2 comprises a plurality of handling zones 40 where items 32 are manipulated. The various handling zones 40 can be fixed or mobile and can include warehouses, trucks, manufacturing plants, conveyors, or sections of a warehouse, plant, or conveyor. Each handling zone 40 includes a cellular/RFID chip interrogation device 30. Each time a tracked item 32 moves from one handling zone 40 to another, an item interrogation is performed by the interrogation device 30 of the new handling zone 40 using the predefined RFID protocol. Using the interrogation information, it can be determined which handling zone 40 the item 32 is currently located in. The item interrogation can be triggered manually (e.g., by the person loading a truck or handling items at a manufacturing plant) or automatically (e.g., when the item passes a gate on a conveyor or passes an interrogation device 30 at the access to a truck's cargo area).

In a just-in-time manufacturing operation, for example, a particular component might be assembled at a first plant (comprising a first handling zone 40(1)) and then delivered by a truck (comprising a second handling zone 40(2)) to a second plant (comprising a third handling zone 40(3)) where it is incorporated into a final product. To facilitate tracking of the component during such an operation, the component is transported in a container 32 that includes an RFID tag 36 with which the component is associated. Initially, the RFID 36 is associated with the interrogation device 30(1) for the first plant 40(1). When the container 32 is loaded onto the truck 40(2), however, the truck's interrogation device 30(2) interrogates (as indicated at 31) the RFID chip 36 to determine which container 32 has been placed on the truck 40(2). Subsequently, when the container 32 is unloaded from the truck 40(2) at the second plant 40(3), an interrogation device 30(3) at the second plant 40(3) interrogates (as indicated at 31) the RFID chip 36 to determine that the item 32 has reached the second plant 40(3).

Figure 3:
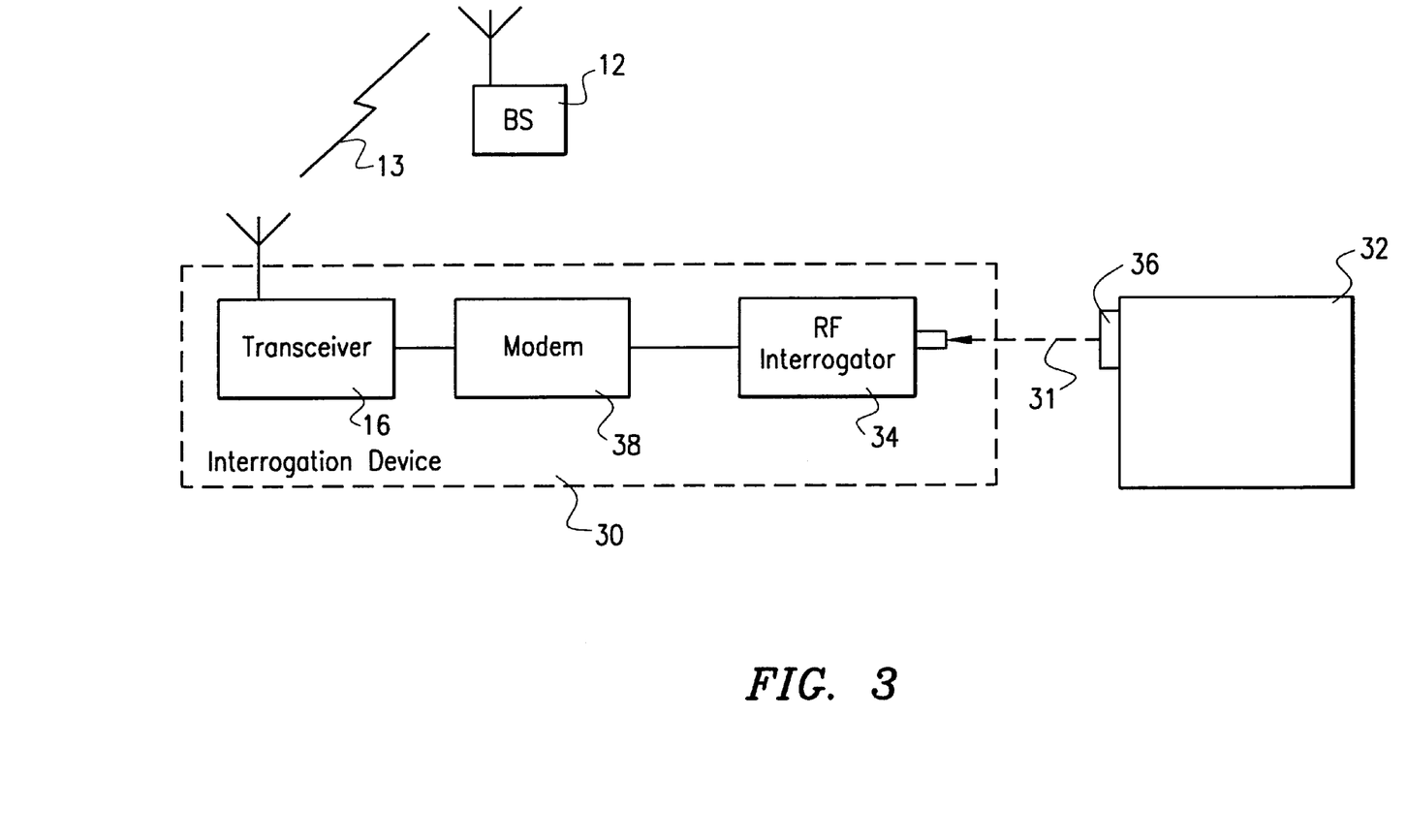
FIG. 3 is a block diagram of a cellular/RFID chip interrogation device.

Referring now to FIG. 3, there is illustrated a block diagram of a cellular/RFID chip interrogation device 30. On one side of the interrogation device is an RF interrogator 34 for reading information, including an item identifier, from RFID tags 36 attached to tracked items 32 that pass near the RF interrogator 34. The item identifier data is passed on to a modem 38, which encodes the data. Coupled to the modem 38 is a mobile station 16, comprising a mobile transceiver or mobile transmitter, for transmitting data from the interrogation device 30 to the cellular network 10. As a tracked item 32 moves past the interrogation device 30 and into a new handling zone 40, the RF interrogator 34 reads an item identifier from the RFID 36 attached to the tracked item 32 and forwards the item identifier to the mobile station 16, which in turn transmits the item identifier, along with an identifier of the interrogation device 30, to a base station 12 of the cellular network 10 over an air interface 13. Thus, the system 2 is able to determine in which handling zone 40 the item 32 is currently located.

Figure 4:
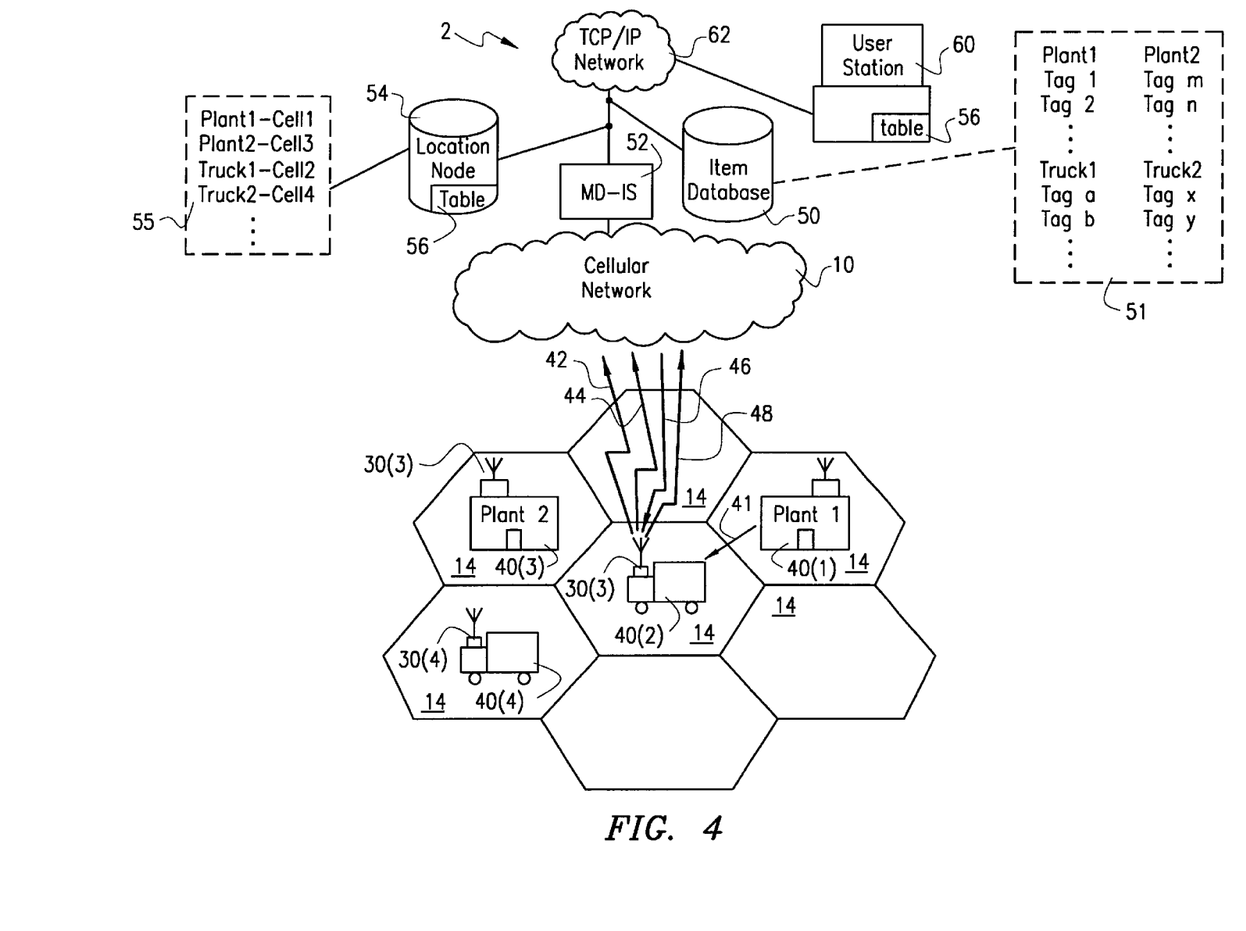
FIG. 4 is a block diagram of the wide area tracking system of the present invention.

Referring now to FIG. 4, there is shown a block diagram of the wide area tracking system 2 of the present invention. In accordance with the preferred embodiment of the invention, the item identifier is transmitted using existing cellular technology by sending an uplink signal 42 over the air interface 13 of the cellular network 10 (see FIG. 1). Each time the item identifier is transmitted by a new interrogation device 30 and received by the cellular network 10, data associating the item 32 and/or its corresponding item identifier with the handling zone 40 and/or interrogation device 30 is routed by the cellular network 10 to an item database 50. The item database 50 stores an index 51 correlating each handling zone 40 with all of the RFID tags 36 that are currently located in that handling zone 40. Although the item database 50 is illustrated as being a separate element, the item database 50 can be included in virtually any node of the cellular network 10. For example, the item database 50 can be part of a home location register (HLR) 19 (see FIG. 1) associated with the mobile station 16, part of a visitor location register (VLR) (not shown), or can be included within some other specific node within the cellular network 10, such as a Mobile Data-Intermediate System (MD-IS) 52 in a CDPD system. Although the MD-IS 52 is illustrated as a separate element from the cellular network 10, the MD-IS 52 is generally part of the cellular network 10. Alternatively, the item database 50 can be located instead in a different network, such as a TCP/IP network 62, that is connected to the cellular network 10.

The mobile station 16 also periodically sends a registration signal 44 over the air interface 13 to inform the wide area tracking system 2 of the current location of the interrogation device 30. The location is derived by the system using the cell-ID for the cell in which the registration signal 44 is received. In a CDPD system, for example, the mobile station 16 automatically re-registers (i.e., sends a registration signal 44 to the network 10) each time the mobile station 16 enters a new cell 14 (as indicated at 41). Each time such a registration 44 occurs, the cellular network routes the registration information to the MD-IS 52 which can derive the location using the cell-ID of the base station 12 that has forwarded the message. The cell ID/handling zone information is then forwarded to a location node 54. The location node 54 then stores a cell index 55 correlating the handling zone 40 or mobile station 16 with the currently serving cell 14. Although the location node 54 is illustrated as being a separate element, the location node 54 can be included in virtually any node of the cellular network 10. As with the item database 50, the location node 54 can also be part of a home location register (HLR) 19 (see FIG. 1) associated with the mobile station 16, part of a visitor location register (VLR) (not shown), or can be included within some other specific node within the cellular network 10, such as a Mobile Data-Intermediate System (MD-IS) 52 in a CDPD system. Alternatively, the location node 54 can be located instead in a different network, such as a TCP/IP network 62, that is connected to the cellular network 10.

Instead of periodically sending a registration signal, the cell location updates can also be performed by paging the mobile station 16. To initiate a page signal 46, the location node 54 queries the HLR 19 that is associated with the interrogation device's mobile station 16 to identify the currently serving MSC 18 for the mobile station 16 (see FIG. 1). The HLR 19 typically stores data identifying the currently serving MSC 18, which data is periodically updated as the mobile station 16 moves through the cellular network 10. The HLR 19 responds to the query with a signal identifying the currently serving MSC 18. The location node 54 then sends another query to the identified currently serving MSC 18 requesting an identification of the currently serving cell 14 for the interrogation device 30. The MSC 18 sends out a page signal 46 from the base stations 12, and the mobile station's 16 response 48 to the page 46 permits the MSC 18 to determine which cell 14 is currently serving the mobile station 16. The cell ID is then returned to the location node 54.

Information about the current geographic location and/or status (e.g., whether an item 32 is in transit or is sitting in a warehouse) for a particular tracked item 32 can be requested by a user station 60 by submitting a location request that includes the item identifier. In the preferred embodiment, the user station 60 comprises a computer terminal, and the request is sent via a TCP/IP network 62 (i.e., the Internet) to the item database 50. It will be appreciated by those skilled in the art, however, that the request can be submitted using any type of data communication network or data communication connection. In response to the request, the item database 50 retrieves the data identifying the handling zone 40 and/or interrogation device 30 with which the tracked item 32 is currently correlated.

Using the retrieved information, user-client software in the user station 60 then requests the current location of the identified handling zone 40 from the location node 54. The location node 54 identifies the cell ID that corresponds to the identified handling zone 40, using correlation information previously stored in the location node 54 or by initiating a page 46 to the mobile station, which returns the cell ID. Once received, the cell ID can be translated into a geographical location using a look-up table 56, which corresponds, for example, to the cellular network topology. In other words, the look-up table 56 stores data identifying an approximate geographical location for each cell 14 in the cellular network 10. Accordingly, the current geographical location of the tracked item 32 is determined by finding, on the look-up table 56, the geographical location that corresponds to the received cell ID and the item location is returned to the user client software. In another embodiment, the cell ID is sent to the user station 60, via the TCP/IP network 62, and the user station 60 contains the look-up table 56.

Figure 5:
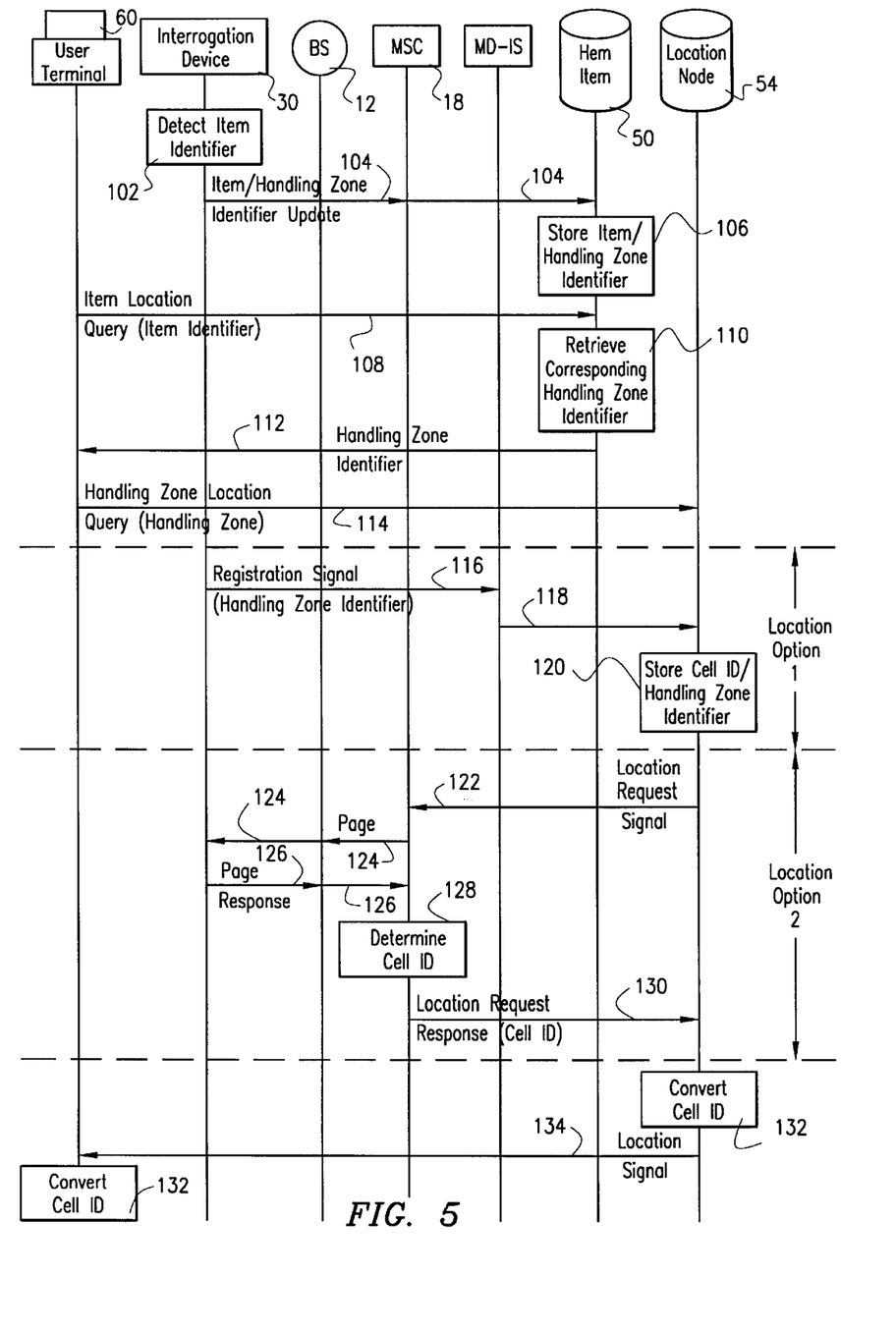
FIG. 5 is a flow diagram illustrating the operation and signaling of the wide area tracking system of the present invention.

Referring now to FIG. 5, there is shown a flow diagram illustrating the operation and signaling of the wide area tracking system 2 of the present invention. Upon moving into a new handling zone 40, a tracked item's identifier is detected by the interrogation device 30 of the handling zone 40 at step 102. After the item identifier is detected, a data signal 104 containing the item identifier and a handling zone identifier is transmitted to the database 50 via the serving base station (BS) 12 and the corresponding MSC 18 and/or an MD-IS routing engine depending on the network implementation. The handling zone identifier can be either a specific identifier for the handling zone 40 or merely a mobile station identification number, wherein it is known which handling zone 40 is associated with the identified mobile station 16. As an alternative, rather than sending the data signal 104 each time a new item identifier is detected, the data signal 104 can contain a plurality of item identifiers that are collected in a buffer and periodically transmitted. Data indexing each item identifier with the handling zone identifier is stored in the database 50 at step 106.

The steps of detecting item identifiers (step 102), routing them to the database 50 (as indicated at 104), and storing the item and handling zone information in the database 50 (step 106) are periodically repeated, either after each new item identifier is detected or on a more infrequent basis, such as after a buffer at the interrogation device 30 becomes full. The wide area tracking system 2 is thereby able to maintain an accurate record of the handling zone 40 within which each item 32 is associated.

At any time during the intermittent updating of item/handling zone association data in steps 102–106, an item location query 108, containing the item identifier for a particular tracked item 32, can be sent from the user terminal 60 to the item database 50. At step 110, the item database 50 retrieves the handling zone identifier that corresponds to the received item identifier. The handling zone identifier is then sent (at 112) to the user-client software to identify the handling zone 40 within which the tracked item 32 is currently located.

The next step in the process is to determine within which cell 14 the identified handling zone 40 is located in. A handling zone location query 114, containing the handling zone identifier received in the previous signal 112, is sent from the user terminal 60 to the location node 54. At that point, two alternatives exist for identifying the cell 14 where the identified interrogation device is located. In the first alternative, a registration signal is periodically sent (as indicated at 116) by the interrogation device 30 to the MD-IS 52 via the serving base station 12 and potentially its corresponding MSC 18 depending on the network implementation. The registration signal includes the handling zone identifier and a cell ID for the cell 14 served by the serving base station 12. Subsequently, in response to the receipt of the handling zone identifier at the MD-IS 52 (at 116), the MD-IS 52 sends a signal 118 containing the interrogation device identifier and the cell ID for the serving cell 14 to the location node 54. Data indexing the interrogation device 30 with the serving cell 14 is stored in the location node 54 at step 120. These steps 116, 118 and 120 generally occur on an intermittent basis without regard to whether an item location query 108 has been received.

In the second alternative, the location node 54 sends a request signal 122 containing the handling zone identifier to the serving MSC 18 (obtained by a request to the HLR) for the general area where the interrogation device 30 is currently located. The serving MSC 18 pages (at 124) the interrogation device 30 via a plurality of base stations 12. The mobile station 16 of the interrogation device 30 responds to the page (at 126) via its currently serving base station 12. The MSC 18 is thereby able to determine, at step 128, in which cell 14 the interrogation device 30 is located according to which base station 12 receives the page response 126 from the interrogation device 30. The cell ID is then returned (at 130) to the location node 54. The cell ID is then converted (at step 132) by the location node 54 into a geographical location, which is sent (at 134) to the user terminal 60. Alternatively, the cell ID can first be sent (at 134) to the user terminal 60, where the cell ID is converted into a geographical location at step 132.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A wide area item tracking system, comprising:
   an item identifier to be associated with an item to be tracked;
   a handling zone associated with an item identification reader for detecting the item identifier of the item to be tracked; a radio frequency identification device (RFID) attached to the item to be tracking, the RFID having encoded thereon the item identifier;
   a cellular transmitter coupled to the item identification reader, the cellular transmitter transmitting upon detection of the item identifier by the coupled item identification reader an item identification signal over an air interface, the cellular transmitter also intermittently transmitting a registration signal over the air interface, wherein the item identification signal includes the detected item identifier and an identification of the handling zone and wherein the registration signal includes the identification of the handling zone;
   a cellular network, said network having a plurality of base stations, each base station conducting cellular communications over the air interface in a predetermined one of a plurality of cells, wherein one of the base stations receives the item identification signal and wherein a currently serving one of the base stations receives one of the registration signals;
   a database for storing item identifier data associating the detected item identifier with the handling zone identification;
   a location node for storing, in receipt of the registration signal, handling zone data associating the handling zone identification with an identification of the cell of the currently serving base station; and
   a server for receiving a location request for a current location of the item to be tracked and for retrieving, in response to the location request, the stored item identifier data from the database to obtain the identification of the handling zone with which the item to be tracked is associated, and retrieving the handling zone data stored in the location node to identify the cell of the base station currently serving the handling zone using the retrieved handling zone identification.

2. The wide area item tracking system of claim 1 wherein the handling zone comprises a mobile transport vehicle.

3. The wide area item tracking system of claim 1 wherein the item identification reader comprises an RF interrogator for detecting data encoded on the RFID.

4. The wide area item tracking system of claim 1 wherein the cellular network comprises a wireless packet data service.

5. The wide area item tracking system of claim 4 wherein the wireless packet data service comprises a Cellular Digital Packet Data (CDPD) system.

6. The wide area item tracking system of claim 5 wherein the CDPD system is coupled to an external network via a Mobile Data-Intermediate System (MD-IS).

7. The wide area item tracking system of claim 4 wherein the wireless packet data service comprises a General Packet Radio Service (GPRS).

8. The wide area item tracking system of claim 1 wherein the database and the location node are located within the cellular network.

9. The wide area item tracking system of claim 1 wherein the database and the location node are located within a TCP/IP network that is connected to the cellular network.

10. The wide area item tracking system of claim 1 wherein the identified current location of the cellular transmitter comprises at least an approximate geographical location of the cell of the currently serving base station.

11. The wide area item tracking system of claim 10 further comprising a look-up table connected to the server, the look-up table storing data correlating the cell of the currently serving base station with said approximate geographical location.

12. A method for tracking a location of items across a wide area, comprising the steps of:
   detecting at a handling zone an item identifier for an item to be tracked; the item identifier being encoded on a radio frequency identification device (RFDI); and the step of detecting the item identifier comprising reading the encoded item identifier using a radio frequency interrogator;
   transmitting the item identifier and an identification of the handling zone over an air interface of a cellular network;
   storing item identifier data associating the item identifier with the handling zone identification;
   transmitting intermittently a registration signal including the identification of the handling zone over the air interface of the cellular network;
   receiving the registration signal at a currently serving cell of the cellular network;
   storing, in response to a receipt of the registration signal, handling zone data associating the handling zone identification with an identification of the currently serving cell;
   receiving a location request for a current location of the item to be tracked;

retrieving, in response to the location request, the stored item identifier data to obtain the identification of the handling zone with which the item to be tracked is associated;

retrieving, in response to the location request, the stored handling zone data; and determining a cell in the cellular network within which the item to be tracked is currently located by determining the cell within which the handling zone is currently located using the retrieved handling zone identification and retrieved handling zone data.

13. The method as in claim 12 further comprising the step of identifying at least an approximate geographical location corresponding to the cell.

14. The method as in claim 12 wherein the cellular network comprises a wireless packet data service.

15. The method as in claim 12 further comprising the step of converting the identification of the currently serving cell into data identifying at least an approximate current geographical location of the item to be tracked.

16. The method as in claim 12 wherein the step of determining the cell in the cellular network within which the item to be tracked is currently located comprises the steps of:

transmitting a page signal over the air interface of the cellular network;

receiving, in a currently serving cell, a page return signal over the air interface of the cellular network; and identifying the currently serving cell as the cell in the cellular network within which the item to be tracked is currently located.

17. The method as in claim 16 further comprising the step of converting the identification of the currently serving cell into data identifying at least an approximate current geographical location of the item to be tracked.

* * * * *